Figure 1:
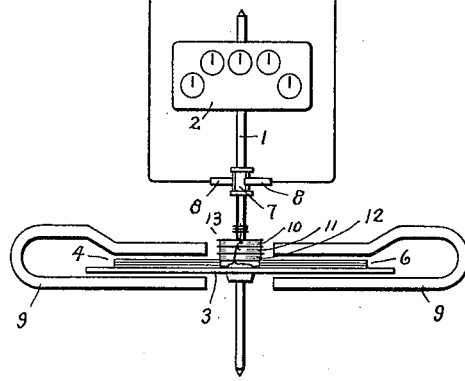

No. 860,961. PATENTED JULY 23, 1907.
D. BROIDO & W. H. LUBACH.
METER.
APPLICATION FILED MAY 4, 1905.

Witnesses

Inventors
David Broido.
Walter Hermann Lubach.
by Albert G. Davis
Att'y

UNITED STATES PATENT OFFICE.

DAVID BROIDO AND WALTER HERMANN LUBACH, OF BERLIN, GERMANY, ASSIGNORS TO GENERAL ELECTRIC COMPANY, A CORPORATION OF NEW YORK.

METER.

No. 860,961.      Specification of Letters Patent.      Patented July 23, 1907.

Application filed May 4, 1905. Serial No. 258,843.

*To all whom it may concern:*

Be it known that we, DAVID BROIDO, a subject of the Emperor of Russia, and WALTER HERMANN LUBACH, a subject of the King of Prussia, both residing at Berlin, Germany, have invented certain new and useful Improvements in Meters, of which the following is a specification.

This invention relates to electric meters, and more particularly to integrating ampere meters of the commutating motor type.

The object of the invention is to eliminate certain sources of error which have been present in instruments of this type as heretofore constructed so that more accurate readings may be obtained.

The common practice heretofore in the construction of ampere hour meters in which a commutating motor is employed driving the dial train of the instrument, has been to arrange the parts for connection of the coils of the meter in parallel relation to a low resistance shunt in the main line leading to the translating devices, so that only a fraction of the total current flows through the meter. This shunt inserted in the main line must have a very low resistance, since otherwise the drop in voltage across the shunt would exceed the limit which is practically permissible on account of the loss of energy therein. Also, the coils of the meter armature, which are in parallel to this shunt, must have a very low resistance in order that the current flowing in the derived circuit of the armature coils may be sufficient to give the necessary torque. This current diverted into the armature coils flows through stationary brushes to the segments of a commutator rotating on the shaft of the meter. On account of the small resistance of this path, any change in the contact resistance at the commutator, that is, any change in the drop of potential between the brushes and the segments of the commutator, will effect a material change in the total resistance of this derived circuit and a corresponding material change in the proportion of the total current which is diverted into the coils of the instrument. It is well known that this contact resistance is never constant, but is dependent on shocks and jars to which the meter is subjected, the oxidation of the commutator segments and the collection of dust thereon and the formation of sparks at the commutator. The division of current between the shunt and the derived circuit of the armature coils does not therefore remain always the same and it is obvious that any change in the proportion of the total current which passes through the armature will destroy the accuracy of the meter's readings. This error due to changes in the contact resistance at the commutator can be eliminated by omitting the shunt entirely and carrying the entire current consumed to the moving element of the meter. In this way the contact resistance can have practically no effect since it must always be very small relatively to the resistance of the translating devices and therefore cannot appreciably affect the current flowing in the circuit. Carrying the entire current consumed through the commutator would tend to increase sparking at the commutator causing a roughening of the coöperating surfaces of the brushes and commutator segments. To prevent this we provide a resistance in parallel to each of the armature coils. These resistances are supported on the moving element of the meter in such a way as to have no torque-producing effect, and not only carry some of the line current but also absorb the inductive discharge when the direction of current flow in the armature coils is reversed and thus prevent sparking. The material used in these resistances shunting the armature coils can be such that errors in the meter readings due to changes in temperature are entirely avoided.

Our invention consists in forming these resistances of material with a low temperature coefficient, so as to compensate for the decrease in the retardation exerted by the drag-magnets on the disk which carries the armature coils, and is heated by them.

Figure 2:
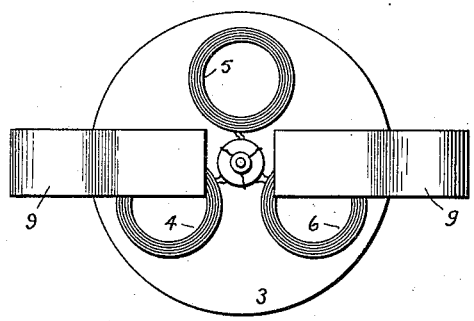
Figure 3:
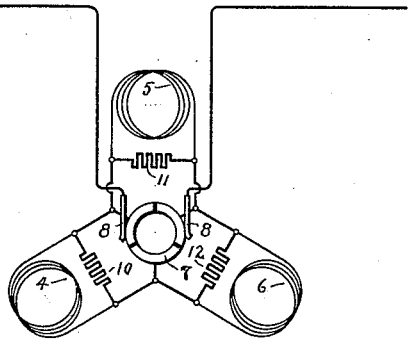

The novel features of our invention will be definitely indicated in the claims appended hereto. The details of construction and the mode of operation of our improved meter will be better understood by reference to the following description taken in connection with the accompanying drawings, which show one embodiment of our invention and, in which Figure 1 is an elevation of an ampere-hour meter; Fig. 2 is a plan view of the same; and Fig. 3 is a diagram of the circuits.

Referring to the drawings, 1 indicates the shaft of the meter mounted for rotation in suitable bearings and geared to a dial 2 on which the consumption of current is read. Supported on the shaft is a disk 3 on which are mounted the armature coils 4, 5 and 6. In this instance, we have shown three of these coils but obviously more can be provided if desired. A commutator 7 secured on the shaft 1 has as many segments as there are armature coils, and each of the coils 4, 5 and 6 is connected between a pair of adjacent commutator segments. Brushes 8 8 mounted on a stationary part of the meter bear against the segments of the commutator. Two or more permanent magnets 9 9 are arranged in position for the disk 3 on shaft 1 and the coils 4, 5 and 6 carried by the disk to rotate in the air gaps of the magnets. In shunt to each of the armature coils 4, 5 and 6 is a resistance 10, 11 and 12, respectively.

These resistances may be wound on a spool 13 mounted on the shaft 1 or in any other position in which the coils of the resistance wire will not coöperate with the magnets 9 to produce a torque.

14 and 15 indicate mains from a source of supply of electric energy leading to translating devices. Instead of connecting the brushes 8 8 to the terminals of a shunt inserted in the main line 15 so that only a fraction of the current consumed is carried through the meter, we connect the brushes 8 8 in series in the line 15, as clearly shown in Figs. 1 and 3, so that the entire current consumed flows through the meter. In this way variations of the contact resistance at the commutator 7 can have no effect, since this resistance will always be small relatively to the resistance of the translating devices and therefore cannot appreciably affect the current flowing in the circuit. The resistances 10, 11, and 12 are connected in parallel to the armature coils 4, 5 and 6 and as the commutator reverses the direction of current flow in the armature coils successively, these resistances absorb the inductive discharge and thus prevent sparking at the commutator so that the surfaces of the commutator segments and the brushes remain smooth even though this relatively large current is carried thereby.

In an integrating electric meter it is usually desired to retard the rotation of the moving element and this is generally accomplished by providing on the shaft of the meter a copper or aluminium disk rotating in the air gaps of permanent magnets. In the meter illustrated and described herein, we make the disk 3 which carries the armature coils 4, 5 and 6 of aluminium so that a single set of magnets 9 9 serve as both the torque-producing and the damping magnets. It is well known that in such a construction a rise in temperature causes the meter to run fast at the same load since the retarding effect falls off more rapidly than the torque of the instrument as the temperature rises. To avoid any error due to changes in temperature we make the resistances 10, 11 and 12 of a material having a low temperature co-efficient so that as the temperature rises a slightly greater proportion of the current flows through the resistances and a smaller proportion through the armature coils. This slight change in the distribution of the current in the two parallel circuits may be made just enough to compensate for the error which would otherwise result from a change in temperature.

The type of ampere hour meter shown herein is selected merely to illustrate the principles of our invention and we wish it understood that these principles may be embodied in other types of ampere hour meters differing widely therefrom. Such modifications we consider within the scope of our invention and we aim to cover them in the claims appended hereto.

What we claim as new and desire to secure by Letters Patent of the United States, is,

1. An integrating electric meter having a moving element, a commutator and armature coils connected to the segments of the commutator carried thereby, resistances having a low-temperature coefficient carried by the moving element and each connected in shunt to an armature coil, a damping plate carried by the moving element, and means for setting up magnetic lines of force through which said armature and damping plate are adapted to move.

2. An integrating ampere meter having a moving element, a commutator and armature coils connected to the segments of the commutator carried thereby, brushes bearing on the commutator, connections to the brushes for carrying the full line current to and from the commutator, a resistance having a low temperature coefficient in shunt to each armature coil, a damping disk carried by the moving element, and a permanent magnet mounted in position for the armature coils and the damping disk to cut the lines of force of its field.

In witness whereof, we have hereunto set our hands this 11 day of April, 1905.

DAVID BROIDO.
WALTER HERMANN LUBACH.

Witnesses:
 JULIUS RUMLAND,
 ALFRED WOLF.